(12) United States Patent
Benyo et al.

(10) Patent No.: US 8,560,176 B2
(45) Date of Patent: Oct. 15, 2013

(54) CONTROLLING METHOD FOR A STEERING SYSTEM

(75) Inventors: Imre Benyo, Budapest (HU); Imre Szepessy, Budapest (HU); Dóra Szabolcs, Gyöngyös (HU); Miklos Aranyi, Budapest (HU)

(73) Assignee: ThyssenKrupp Presta AG, Eschen (LI)

( * ) Notice: Subject to any disclaimer, the term of this patent is extended or adjusted under 35 U.S.C. 154(b) by 498 days.

(21) Appl. No.: 13/014,979

(22) Filed: Jan. 27, 2011

(65) Prior Publication Data

US 2011/0184608 A1    Jul. 28, 2011

(30) Foreign Application Priority Data

Jan. 27, 2010    (EP) .................................... 10000792

(51) Int. Cl.
*A01B 69/00* (2006.01)

(52) U.S. Cl.
USPC .................................. 701/41; 701/42; 701/44

(58) Field of Classification Search
USPC .............................................. 701/41, 42, 44
See application file for complete search history.

(56) References Cited

U.S. PATENT DOCUMENTS

| | | | | |
|---|---|---|---|---|
| 2,436,153 | A * | 2/1948 | Sanmori | 280/775 |
| 5,767,664 | A * | 6/1998 | Price | 323/313 |
| 5,896,942 | A * | 4/1999 | Bohner et al. | 180/402 |
| 7,401,677 | B2 * | 7/2008 | Boyle et al. | 180/444 |
| 2002/0084757 | A1 * | 7/2002 | Ewbank et al. | 318/34 |
| 2004/0024564 | A1 * | 2/2004 | Baize | 702/151 |
| 2005/0072621 | A1 * | 4/2005 | Hara et al. | 180/444 |
| 2005/0087121 | A1 * | 4/2005 | Brown et al. | 116/31 |
| 2008/0121457 | A1 * | 5/2008 | Hashimoto et al. | 180/444 |
| 2008/0141817 | A1 * | 6/2008 | Fuchigami et al. | 74/493 |
| 2008/0294313 | A1 * | 11/2008 | Aoki et al. | 701/43 |

FOREIGN PATENT DOCUMENTS

| | | |
|---|---|---|
| DE | 102006043069 A1 | 3/2008 |
| EP | 1749730 A2 | 2/2007 |
| EP | 1857349 A1 | 11/2007 |
| EP | 1932745 A2 | 6/2008 |

OTHER PUBLICATIONS

European Search Report issued in related European Application No. 10 00 0792.

* cited by examiner

*Primary Examiner* — Calvin Cheung
(74) *Attorney, Agent, or Firm* — Novak Druce Connolly Bove + Quigg LLP

(57) ABSTRACT

The invention refers to a steering device and a method for controlling a steering device with steering power support means for a motor vehicle with at least one steerable road wheel.

16 Claims, 6 Drawing Sheets

CONTROLLING METHOD FOR A STEERING SYSTEM

CROSS-REFERENCE TO RELATED APPLICATIONS

Figure 1:
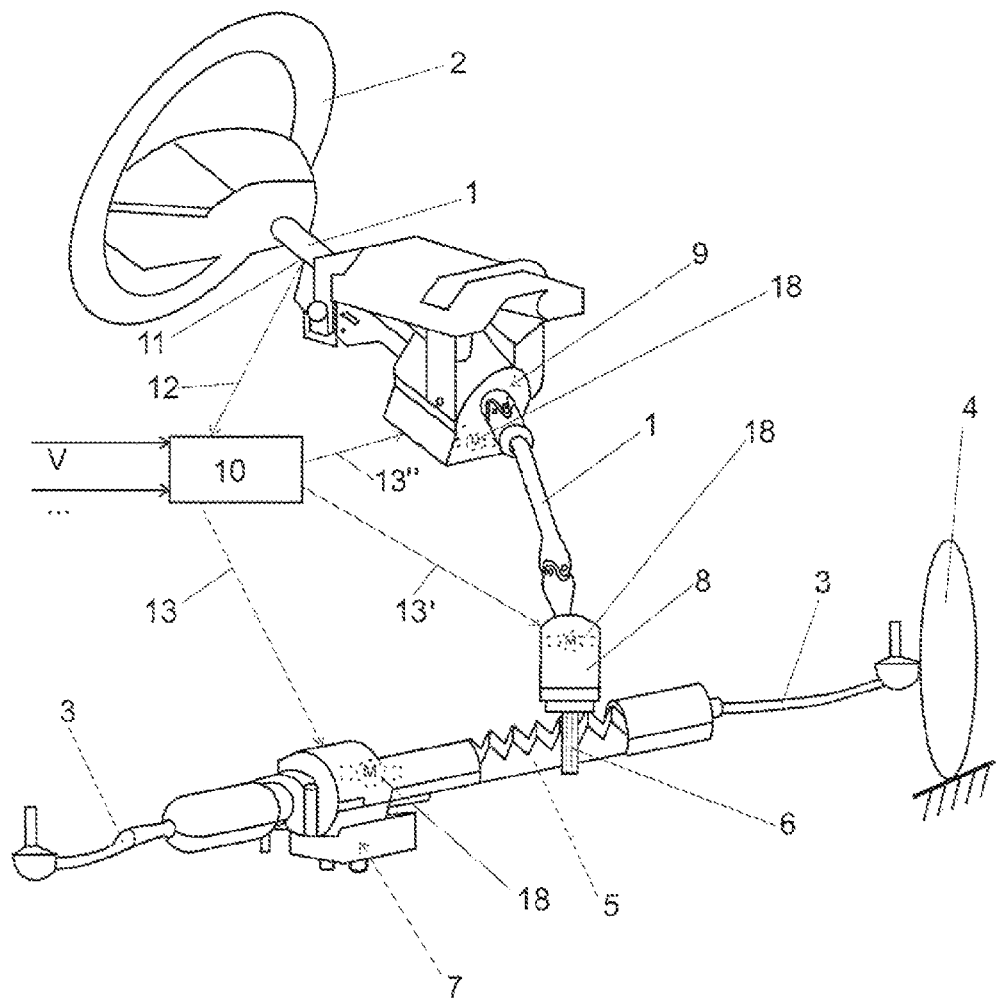

This application claims priority from European Patent Application No. 10000792.1, filed Jan. 27, 2010, the entire contents of which are incorporated herein by reference in its entirety.

The invention concerns to a device and a method for controlling a steering device with steering power support means for a motor vehicle with at least one steerable road wheel comprising:

a steering shaft with a first end to can adopt a steering wheel and with a second end which coupled with a pinion, wherein said pinion is engaging in a rack, wherein said rack is adjustable in its longitudinal direction to different positions, whereby said at least one road wheel is turning, whereby in a middle position of said rack said road wheel is turned as to steer the vehicle in a straight ahead direction;

a control device controlling said power support means sensing means detecting torque introduced in said steering shaft sensing means detecting the speed of the vehicle means to determine said position of said rack.

A basic problem in such steering devices is to avoid disturbances of driver feel in cases of side wind or cross-falling roadway. The problem is generally solved by a "pull drift compensation".

DESCRIPTION OF RELATED ART

EP1930229A2 discloses a solution to compensate such disturbances. According to the disclosure the hand wheel torque is reduced by a compensation value, which will integrate over a determined time. The integrated value is used as compensation value to compensate the forces introduced by side wind or cross-falling roadway.

One problem of such solution consists on the slow functionality of this compensation method. Further the compensation value is depending on the time duration of disturbances and the value varies over the time. This can result in a discrepancy between the expectations and the feeling of steering to the driver.

DE102006017010A1 discloses a method to compensate static steering forces in one direction e.g. as result from a side wind or a cross-falling roadway. The disclosure proposes to increase or to decrease the power of an electrical motor, which is responsible for the assist steering force. This document does not disclose how the increasing or decreasing of the power of the electric motor is controlled. Further the method needs a time to detect the static state of the system.

EP1860018A2 discloses a method of stabilizing the vehicle behavior by performing assist control so that actual self-aligning torque follows standard self-aligning torque by focusing attention on self-aligning torque of a vehicle. The document proposes to solve the problem by detecting or estimating a self aligning torque value and calculates a standard self aligning torque value based on a steering angle and the vehicle speed and corrects the current command value. This method is not suitable to improve the driving behavior in case of side wind or cross-falling roadway.

SUMMARY OF THE INVENTION

The invention has been implemented in view of the circumstances as described above and an object of the invention is to provide a steering control method and a steering device which can improve the behavior of a vehicle in cases of side wind or cross-falling roadway.

The object of the invention is achieved by a method according to claim 1 and by device with the features of claim 10. The dependent claims describe advantageous aspects of the invention.

The solution of the object consist of a method for controlling wherein the steering device further comprises a device to determining the instantaneous rack load in its longitudinal direction, which is introduced by said steerable road wheel and the difference between the said middle position and instantaneous position of rack is determined; if the difference is lower than a threshold value and if the speed of the vehicle is higher than a threshold value, the instantaneous value of rack load is stored into the control device as an offset value.

Further the solution of the object consist of a steering device wherein the device comprises a device for determining the instantaneous rack load in its longitudinal direction, which is introduced by said steerable road wheel; and a difference calculation means to calculate the difference between the said middle position and said instantaneous position of the rack; a first check means to check whether the difference is lower than a threshold value; a second check means to check whether the speed of the vehicle is higher than a threshold value; and an output means, which outputs the instantaneous rack load to the storage device as an offset value, if the first and second means' results are true.

The virtual rack load value, which is used to control the steering device, is equal to the measured or calculated instantaneous rack load reduced by the determined offset value or a part of the determined offset value, which are calculated and stored as described above, if the first and second means' results are true. The steering support torque is calculated on the basis of this virtual rack load value (=compensated rack load).

One aspect of the invention consists of the compensation level. It could be favorable to compensate the pull drift partial only. Such parts could be 0% of the calculated instantaneous rack load compensation value up to 100% of the calculated instantaneous rack load compensation value. In a preferred embodiment the part is 0% in case that the vehicle is in straight ahead run position or in case that the calculated instantaneous rack load compensation value is smaller than a threshold value (as example 0.5 Nm). The compensation could be reach 100% if the calculated instantaneous rack load compensation value is greater than another threshold value (as example 3 Nm).

As the result of the application of such device and/or method the temporary disturbances, like side wind or cross-falling roadway are compensated. The driver does not have to compensate such disturbances himself. The compensation according the invention has a high agility. To avoid vibrations, the calculation procedure in a preferred embodiment is filtered with a low pass filter. In a further preferred embodiment the time constant for filter function is 5 seconds, or more preferred 3 seconds. By such integration times the driver gets the feeling for a side wind or cross-falling roadway, and gets a rapid compensation of such disturbances. Nevertheless a critical driving situation, which deems to have nearly the same reaction, par example a chuckhole, does not introduce a misleading offset value for the rack load value.

Another aspect of the invention consists of the threshold limit values to start the adjusting procedure for the rack load offset value. In a preferred embodiment of the invention the instantaneous value of rack load is stored into the control device as an offset value only if the instantaneous value of rack load is higher than threshold value. Referring to this aspect of the invention, the steering device comprises further a third check means to check whether the instantaneous value of the rack load is higher than a threshold value of the instantaneous value, and the output means output the instantaneous rack load to the storage device as an offset value, if the first, second and the said third check means' result where true In a preferred embodiment of the invention the threshold value for the vehicle speed is 30 km/h, more preferred 40 km/h, to get the result by the second check means "true".

In a preferred embodiment the difference between the middle position and the instantaneous position of the rack is less than 5 mm, more preferred less than 1 mm, and further more preferred less than 0.1 mm, to get the result by the first check means "true".

By using the invention it could be also possible and favorable to have a fourth check means to check the values of the steering speed. If the steering speed value is less than a threshold value for a maximum steering speed, the fourth check means output the value true. Threshold maximum steering speed value of 10 degree/second is a favorable value, because in a parking situation often higher values are reached.

Further is could be possible and favorable to have a fifth check means to check the values of the yaw rate. If the yaw value is less than a threshold value for a maximum yaw, the fifth check means output the value true. The threshold maximum yaw rate value depends on the vehicle characteristics and the driver experience. Values of 0.9 degree/second are using for sportive driving. More common the threshold value is 0.6 or 0.3 degree/second for more comfortable driving.

Figure 2:
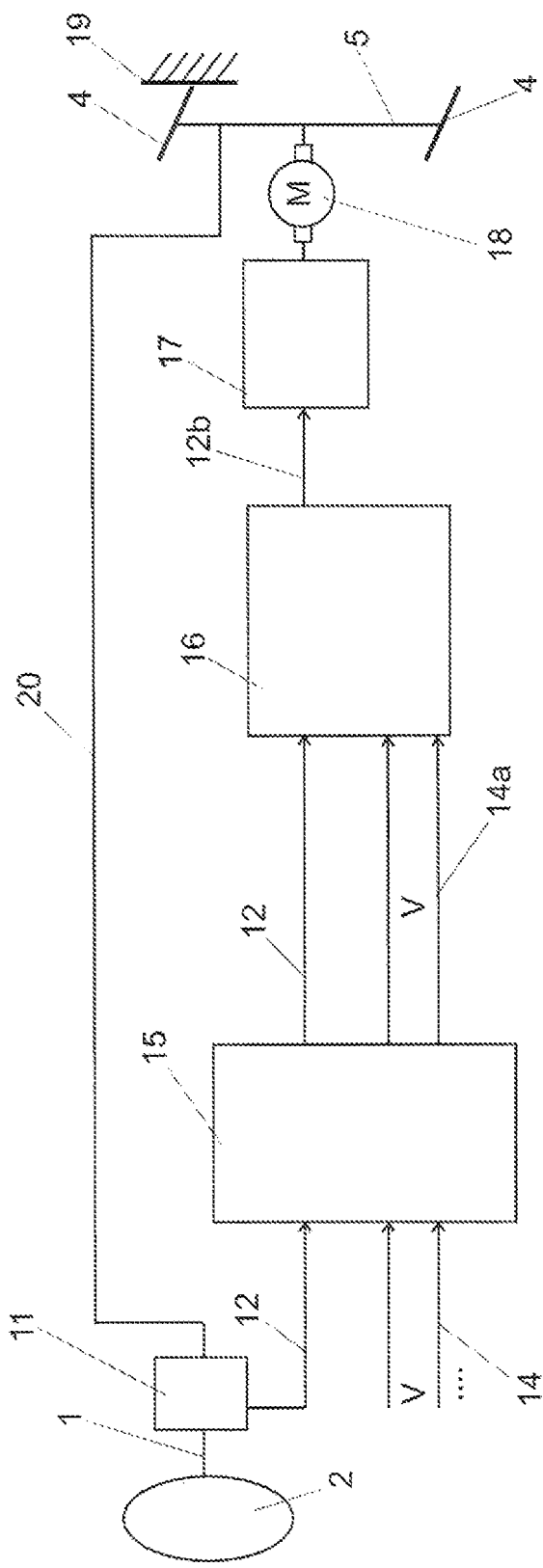
Figure 3:
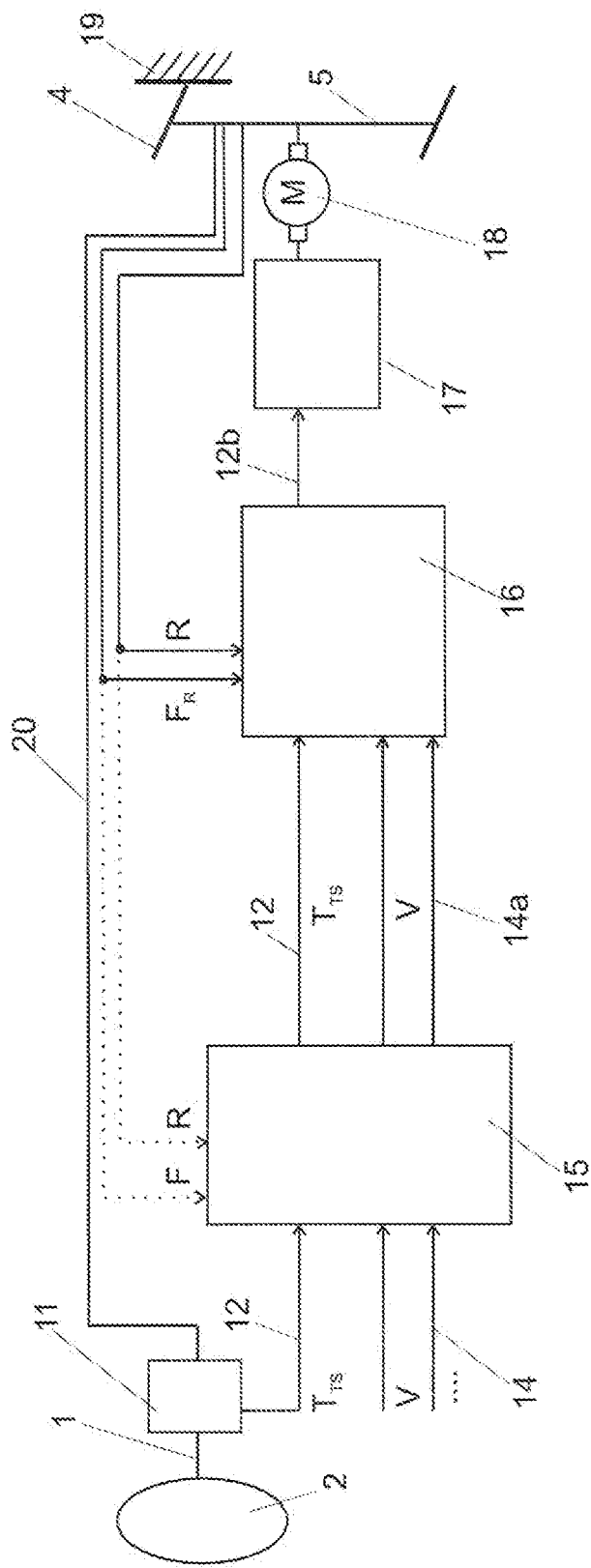
Figure 4:
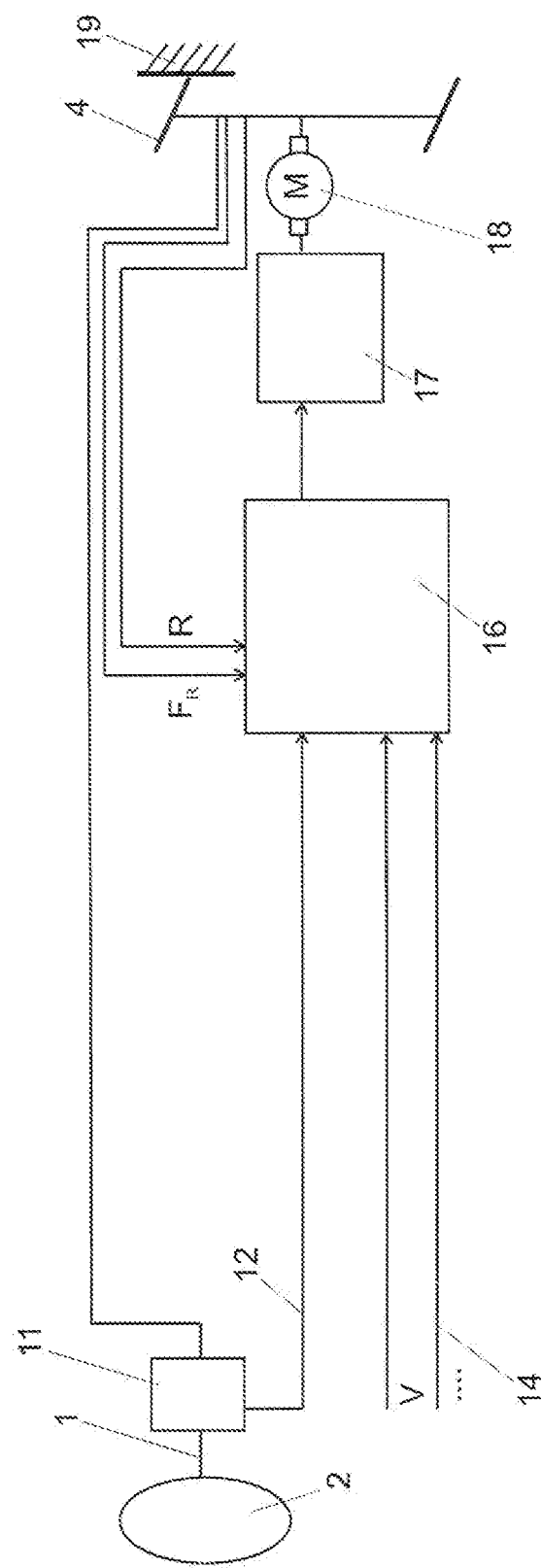
Figure 5:
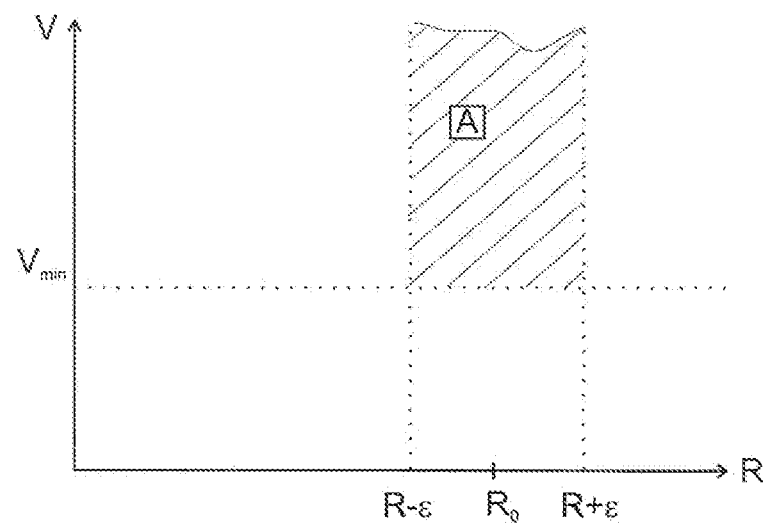
Figure 6:
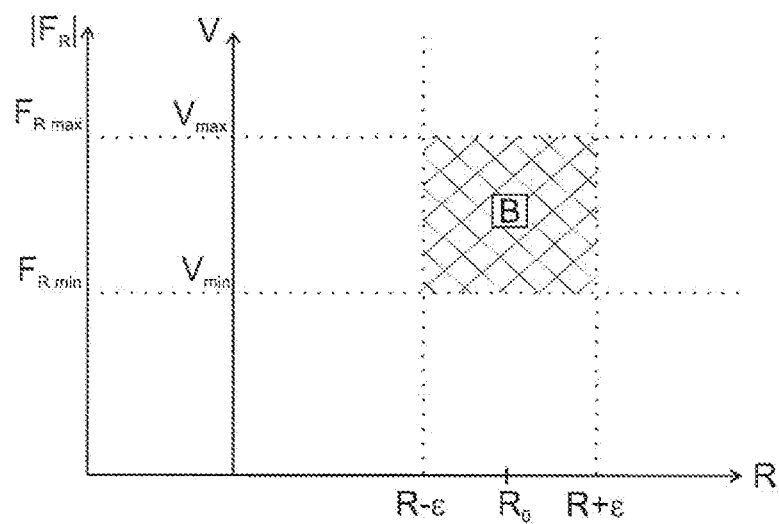
Figure 7:
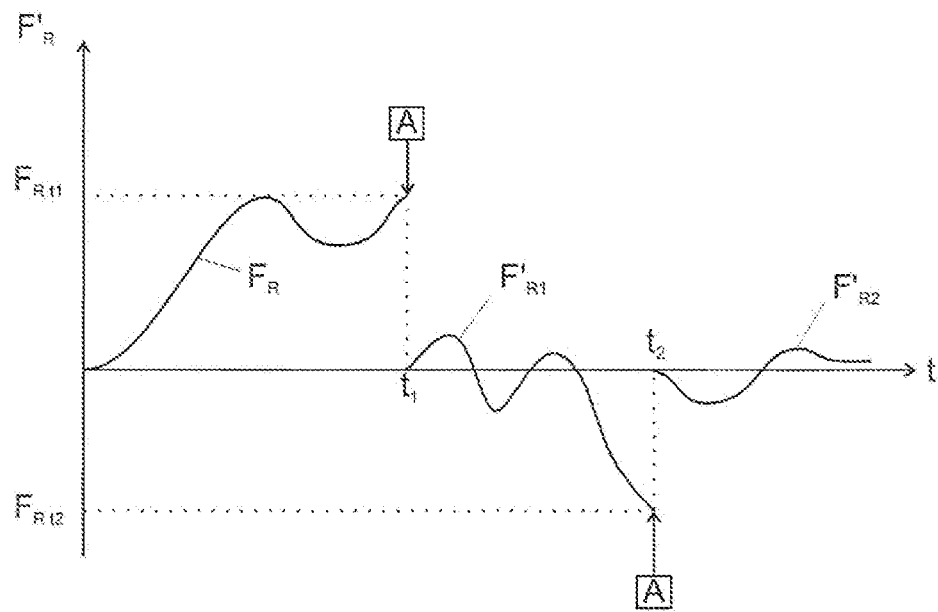
Figure 8:
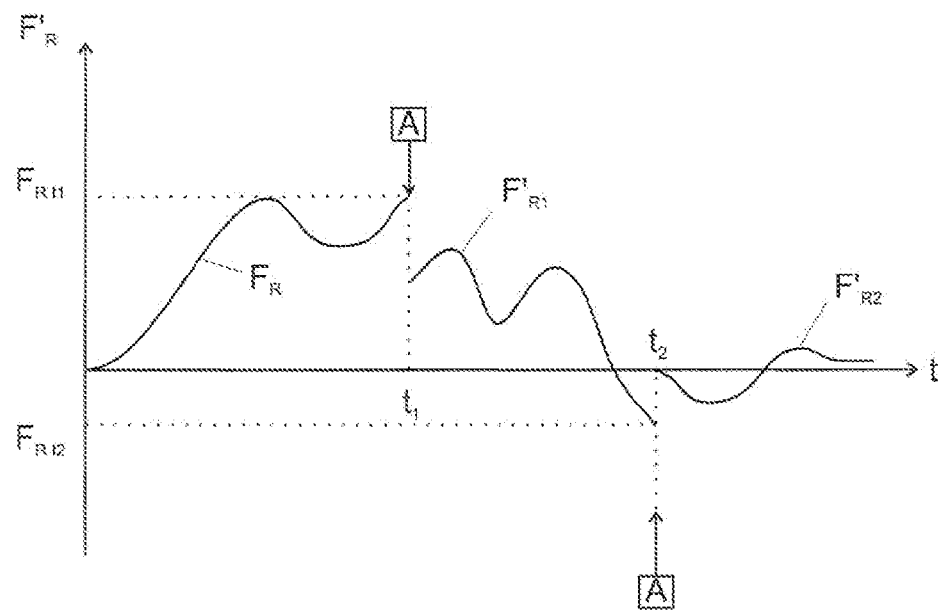

The invention will further be described on sample embodiments which are shown in the following figures:

FIG. 1 Steering device with steering power support means according to the invention;

FIG. 2 Block diagram of a steering control device according to the invention;

FIG. 3 Block diagram of a steering control device according to another embodiment of invention;

FIG. 4 Block diagram of a steering control device according to another embodiment of invention;

FIG. 5 View of working area;

FIG. 6 View of alternative working area;

FIG. 7 View of offset compensation results as one aspect of the invention;

FIG. 8 View of offset compensation results as another aspect of the invention.

FIG. 1 shows a steering device according a first embodiment applicable to the invention. The steering device comprises a steering shaft 1 and a steering hand wheel 2 which is adopt to a first end of the steering shaft 1. The road wheel 4 is adjustable by a tie rod 3. The tie rod 3 is driven by a rack 5. A pinion 6 meshes with the rack 5 and, by rotating the pinion 6, the rack 5 is driven in longitudinal direction. The pinion 5 is driven by rotating the hand wheel 2 wherein the rotating torque is transmitted by the steering shaft 1. The steering device comprises further a power support mean to introduce a support torque in to the steering actuator. A power support means 7 should be in a first embodiment arranged to act in longitudinal direction to the rack 5. Such power support means are well known and can use an electric motor 18, which is coupled over a belt drive to a ball screw mechanism to drive the rack in longitudinal direction.

According to a second embodiment applicable to the invention, the power support means 8 is arranged to drive the pinion 6. In this case the power support mean could consist of an electric motor 18, which is coupled to the pinion 6 by a reduction gear.

In another embodiment applicable to the invention, the power support means 9 is arranged near the steering column to introduce the support, in this case a support torque, into the steering shaft 1. Also in this case the power support means could consist of an electric motor 18, which is coupled to steering shaft by a reduction gear.

A control device 10 get signals 12 from a torque sensor 11 and other signals, at least for the vehicle speed V, and calculates supply power values 13, 13'; 13" outputting them to the electric motor of the power support means 7 or power support means 8 or power support means 9 depending on the particular embodiment of the steering device. When the driver adjusts the steering wheel 2, he introduces a steering shaft torque into the steering device, which is measured by the steering torque sensor 11. Depending on the value of the steering torque signal 11, the vehicle speed, and other parameters of the vehicle and perhaps of other parameters of the steering situation, the control device 10 calculates a power support moment to reduce the hand wheel torque for the driver.

All of these above called different embodiments applicable to the invention for the arrangement of the power support means can be controlled by different embodiments of control devices and with different control methods.

FIG. 2 shows a first embodiment of the control device and control method for the steering device with steering power support means. The steering torque value 12, which is introduced by the steering hand wheel 2 and measurement by the torque sensor 11, is output to an observer device 15, which calculates state parameters for the steering system or vehicle system on the basis of a steering device model and or vehicle model. Further at least the vehicle speed V is output to the observer device 15 of the steering control device. If there are further measured values likes a vehicle acceleration and/or steering angle and/or steering angle speed and/or acceleration and/or other steering and/or vehicle values are available, they will also be fed into the observer device of the controlling device. In the observer device 15, many necessary or useful parameters of the vehicle and the steering system are calculated to improve the controlling of the steering support means. On the basis of the steering shaft torque 12 and the vehicle speed V and other calculated and/or measured vehicle and/or steering parameters 14a the control device 16 calculates requested motor torques 12b and outputs them to the motor control device 17. The motor control device 17 outputs the motor current values to the coils of the motor 18. Usually such motor control device works with a pulse width modulation (PWM), which is well known in the prior art. Other methods to control the electric motor 18 are also possible and applicable. The motor outputs the torque to adjust the rack 5 in a longitudinal direction to turn the road wheels 4. By the road surface 19 a back load in longitudinal direction is introduced into the rack 5. Through a mechanical coupling 20, feedback information is transferred back into the steering shaft 1, thereby closing the feedback control circuit.

FIG. 3 shows a second embodiment of the invention. As a difference to the first embodiment of the invention, in the second embodiment the values for the rack load $F_R$ and/or rack position R are directly measured and introduced into the control device 16. According to this second embodiment sensors to measure the rack load and/or the rack position are necessary. The advantaged of this embodiment is an improved calculation basis to calculate the requested motor torque 12b. If such sensors are available, it is also preferred to feed such measurement values into the observer device 15.

A third embodiment of the invention is shown in FIG. 4. This embodiment is like the first embodiment (FIG. 2), but without any observer device 15. In this case the values for the rack load $F_R$ and rack position R have to be measured because there is no calculation device which could calculate such values on basis other measured values.

FIG. 5 shows a view of working area for the control method likes invention. The rack position R is drawn on the abscissa. $R_0$ is the value of the middle position of the rack 5, which is coherent with the straight ahead turning position of the road wheel 4. The value E designates a threshold value for the difference $R-R_0$ between the middle or center position and the instantaneous position of the rack to start the offset calculation procedure to calculate the rack load offset. In a preferred embodiment this difference value $\epsilon$ is less than 5 mm which is equal to $\epsilon$=5 mm. More preferred is $\epsilon$=1 mm and further more preferred $\epsilon$ is less than 0.1 mm.

The ordinate shows the vehicle speed V with a threshold minimum limit $V_{min}$. If the rack load R is between the threshold limits R−$\epsilon$ and R+$\epsilon$ and the vehicle speed is greater than a threshold minimum value $V_{min}$, the vehicle state is in the parameter field (=working area A). If the vehicle state is in this parameter field, the working area A is reached and the offset adjusting calculation procedure for the rack load is started.

The minimum vehicle speed value $V_{min}$ is in the preferred embodiment 30 km/h and more preferred 40 km/h. In such case the vehicle is usually driven in a relatively constant situation like a highway driving state. If the vehicle speed less than 30 km/h mostly the vehicle is driven in a non-static driving situations like in a parking situation. In such situations it is very often not desired to adopt the rack load offset. More preferred is a threshold minimum vehicle speed $V_{min}$ of 40 km/h, because in such situation the vehicle is at least in a higher speed city driving situation with a higher static driving portion or in a slow country road driving situation. It could be useful to set the minimum vehicle speed value $V_{min}$ as to 60 km/h. At vehicle speeds greater than 60 km/h the driving situation is most probably in a static driving situation like a highway or motorway driving situation.

To improve the safety of such a system it could also be necessary to set limits also for the maximum vehicle speed $V_{max}$ and/or limits for the rack load itself. Such limits are shown in FIG. 6. In FIG. 6 all limits are shown together: minimum and maximum vehicle speed and minimum or maximum rack load. According to a general aspect of the invention, the minimum of the vehicle speed is only necessary to solve the object of the invention. To use a maximum vehicle speed and/or a minimum of rack load and/or a maximum of rack load gives more beneficial embodiments of the invention. In this case the working area B marks the parameter field in which the offset adjusting calculation procedure for the rack load is start.

If the vehicle speed is exceeding the threshold maximum vehicle speed $V_{max}$ in this beneficial embodiment the offset adjusting procedure for the rack load offset value is stopped. This could be necessary to avoid the suppression of important feedbacks from the road surface in high speed driving situations. Especially to improve the vehicle stability such offset compensation could be favorably stopped. Further to lead the driver to drive more carefully, it could be helpful to give the driver more rack load feeling in high-speed situations. Such maximum vehicle speed $V_{max}$ could be set as 200 km/h or more preferred set as 140 km/h or further more preferred set as 120 km/h.

In combination or separate to the maximum vehicle speed limit, it could be preferred to use also the rack load itself as an indicator to start the adjusting procedure for the rack load offset value. The rack load $F_R$ into the right direction could be described as positive rack load +$F_R$ and the rack load in the left direction could be described as negative rack load −$F_R$. The turning of vehicle into right hand or left hand direction has basically the same influence to the driving stability. Therefore it is useful to set the limits for the rack load as absolute value of rack load. In the FIG. 6 as second ordinate, the absolute value of rack load $|F_R|$ is also shown. If the absolute value of rack load $|F_R|$ is less than a minimum rack load value $F_{Rmin}$ it could be not useful to adjust the rack load offset. A preferred value for such minimum rack load should be 0.5 Nm, more preferred 1 Nm and further more preferred 2 Nm. In such cases the driver will get enough feeling of side wind or other disturbances to steer the vehicle well. As tests show the 2 Nm limit gives a very good feedback feeling of the road to the driver.

Further it could be critical to adjust the rack load offset by the instantaneous rack load value $F_R$ itself if the absolute value of rack load value $|F_R|$ is extends a maximum rack load value $F_{Rmax}$. In such cases it could happen that a critical driving situation would be hidden. Such maximum rack load values $F_{Rmax}$ could be a value of 20 Nm. More preferred the adjusting procedure for the rack load offset value is stopped, if the absolute value of rack load extend maximum rack load $F_{Rmax}$ value of 10 Nm. FIG. 6 shows in the summary the range area B in which the rack load offset value is adjusted. In this embodiment all limits, minimum and maximum rack load and maximum vehicle speed, are checked before starting the adjusting procedure for the rack load offset value.

FIG. 7 shows results of such an offset compensation for the rack load as an example in a case for a 100% compensation. In the diagram the compensated rack load $F'_R$ is shown as function over the driving time t. When the vehicle is started the virtual rack load=compensated rack load $F'_R$ is equal to the measured rack load $F_R$. At different times $t_1$ or $t_2$ the working area or the compensation area A (according to the embodiment like FIG. 6b) is fulfilled and the offset compensation procedure is started. At the first time $t_1$ in which the working area A is reached the instantaneous (virtual) rack load $F_{Rt1}$ is used as offset value. After the compensation procedure the virtual rack load is equal to the line $F'_{R1}$. Some time later, the vehicle state is reaching the working area A a second time $t_2$. At this second time $t_2$ the instantaneous virtual rack load $F_{Rt2}$ is used as cumulative second rack load offset. As a result the virtual rack load line is equal the line $F'_{R2}$. All such offset values are cumulated. As a result the virtual rack load $F'_R$ differs from the real measured rack load $F_R$. If the vehicle is stopped the offset value for the rack load is set to 0. The virtual rack load $F'_R$ is equal to the measured rack load $F_R$ again. Of course the measured rack load $F_R$, called in relation to FIG. 7 and FIG. 8 or in general, could be also a determined rack load $F_R$ by the observer 15.

FIG. 8 shows results of such an offset compensation for the rack load as an example in a case for a less than 100% compensation. In the diagram the compensated rack load $F'_R$ is shown as function over the driving time t. When the vehicle is started the virtual rack load=compensated rack load $F'_R$ is equal to the measured rack load $F_R$. At different times $t_1$ or $t_2$ the working area or the compensation area A (according to the embodiment like FIG. 6b) is fulfilled and the offset compensation procedure is started. At the first time $t_1$ in which the working area A is reached the instantaneous (virtual) rack load $F_{Rt1}$ is used as a basis for the offset value. The offset value is determined by a function or a look up table of the instantaneous (virtual) rack load $F_{Rt1}$ at the time $t_1$. After the compensation procedure the virtual rack load is equal to the line $F'_{R1}$ (and do not start with the value "0"). Some time later, the vehicle state is reaching the working area A a second time $t_2$. At this second time $t_2$ the instantaneous virtual rack load $F_{Rt2}$ is used as basis of the next compensation step. In this case the look up table or the function give a 100% compensation rate back. As result the instantaneous virtual rack load $F_{Rt2}$ is used (with 100%) as cumulative second rack load offset. As a result the virtual rack load line is equal the line $F'_{R2}$. All such offset values are cumulated. As a result the virtual rack load $F'_R$ differs from the real measured rack load $F_R$. If the vehicle is stopped the offset value for the rack load is set to 0. The virtual rack load $F'_R$ is equal to the measured rack load $F_R$ again.

Such look up function or table can give a compensation value on basis of the instantaneous virtual rack load $F_{Rt2}$ like following table:

| instantaneous virtual rack load $F_{Rt2}$ | compensation value, which is add to the measured rack load |
|---|---|
| 0 Nm | 0 Nm |
| 0.5 Nm | 0 Nm |
| 1.5 Nm | 1 Nm |
| 3 Nm | 3 Nm |
| 4 Nm | 4 Nm |

Really the table would be more detailed, but the short table shows the principle.

The partial compensation of the rack load can used in combination or as an alternative to the minimum and/or maximum rack load indicated start of the adjusting procedure for the rack load offset value. The maximum rack load indication could be simple realized by using a look up table, which gives the compensation value of "0" back, in case of a instantaneous virtual rack load $F_{Rt2}$ higher than 10 Nm or 20 Nm whatever is preferred as to be a maximum value.

REFERENCES 1 steering shaft
2 steering hand wheel
3 tie rod
4 road wheel
5 rack
6 pinion
7 power support means
8 power support means
9 power support means
10 control device
11 torque sensor
12 steering shaft torque
12b requested motor torque
13 power value
13' power value
13" power value
14 parameters
15 observer device
16 control device
17 motor control device
18 electric motor
19 road surface
20 mechanical coupling
V vehicle speed
R rack position
$R_0$ middle position
ε threshold value
$V_{min}$ minimum vehicle speed
$V_{max}$ maximum vehicle speed
$F_R$ rack load
$F'_R$ compensation rack load
A working area
B working area

The invention claimed is:

1. A method comprising:
controlling a steering device with steering power support means for a motor vehicle with at least one steerable road wheel, the steering device including:
a steering shaft with a first end to adopt a steering wheel and with a second end which is coupled to a pinion, wherein said pinion is engaging in a rack, wherein said rack is adjustable in its longitudinal direction to different positions, whereby said at least one steerable road wheel is capable of turning, whereby in a middle position of said rack said at least one steerable road wheel is turned as to steer said motor vehicle in a straight ahead direction;
a control device controlling said steering power support means;
a first sensing means detecting torque introduced in said steering shaft;
a second sensing means detecting speed of said motor vehicle;
a means for determining said different positions of said rack; and
a device for determining an instantaneous rack load in its longitudinal direction, which is introduced by said at least one steerable road wheel;
determining a difference between said middle position and an instantaneous position of said rack; and
storing an instantaneous value of said rack load into said control device as an offset value, if said difference is lower than a threshold value and if said speed of said motor vehicle is higher than a threshold value.

2. The method according to claim 1, wherein said storing said instantaneous value comprises:
storing said instantaneous value of said rack load into said control device as an offset value if an instantaneous measured or determined value of rack load is higher than a threshold value.

3. The method according to claim 1, further comprising:
using said offset value, at least in part, in said control device to calculate an offset to a power support moment or a torque to reduce hand wheel torque for a driver.

4. The method according to claim 3, wherein at least part of said offset value is added to said power support moment or said torque.

5. The method according to claim 3, wherein said offset value is used only at vehicle speeds between and including 30 kilometers per hour (km/h) and 200 km/h.

6. The method according to claim 3, wherein said offset value is used only at rack displacements of more than 0.1 millimeters (mm) from a center position or said middle position.

7. The method according to claim 6, wherein said offset value is used only at rack displacements of more than 1 mm from said center position or said middle position.

8. The method according to claim 7, wherein said offset value is used only at rack displacements of more than 5 mm from said center position or said middle position.

9. The method according to claim 3, wherein said offset value is used only below maximum rack loads defined by steering column torques of less than 20 Newton-meters (Nm).

10. The method according to claim 9, wherein said offset value is used only below maximum rack loads defined by steering column torques of less than 10 Nm.

11. The method according to claim 3, wherein said offset value is used only above minimum rack loads defined by steering column torques of more than 2 Nm.

12. The method according to claim 11, wherein said offset value is used only above minimum rack loads defined by steering column torques of more than 1 Nm.

13. The method according to claim 12, wherein said offset value is used only above minimum rack loads defined by steering column torques of more than 0.1 Nm.

14. The method according to claim 3, wherein said minimum and maximum rack loads and said vehicle speed are checked before starting an adjusting procedure for the rack load offset value.

15. A steering device with steering power support means for a motor vehicle with at least one steerable road wheel comprising:
   a steering shaft with a first end to adopt a steering wheel and with a second end which is coupled with a pinion, wherein said pinion is engaging in a rack, wherein said rack is adjustable in its longitudinal direction to different positions, whereby said at least one steerable road wheel is turning, whereby in a middle position of said rack said at least one steerable road wheel is turned as to steer said motor vehicle in a straight ahead direction;
   a control device controls said steering power support means comprising a storage device;
   a first sensing means detects torque introduced in said steering shaft;
   a second sensing means detects speed of said motor vehicle; and
   a means for that determines said different positions of said rack;
   a device determines an instantaneous rack load in its longitudinal direction, which is introduced by said at least one steerable road wheel;
   a difference calculation means calculates a difference between said middle position and an instantaneous position of said rack;
   a first check means checks whether said difference is lower than a threshold value;
   a second check means checks whether said speed of said motor vehicle is higher than a speed threshold value; and
   an output means outputs said instantaneous rack load to said storage device as an offset value, if results of said first check means and said second check means are true.

16. The steering device according claim 15, wherein said steering device further comprises:
   a third check means checks whether said instantaneous value of rack load is higher than a threshold value, and wherein said output means outputs said instantaneous rack load to said storage device as an offset value, if a result of said third check means is also true.

* * * * *